United States Patent
Nair et al.

(10) Patent No.: US 12,328,090 B2
(45) Date of Patent: Jun. 10, 2025

(54) SYSTEM AND METHOD FOR CONTROLLING OPERATION OF A MOTOR

(71) Applicant: TATA ELXSI LIMITED, Bangalore (IN)

(72) Inventors: Anush Gopalakrishnan Nair, Bangalore (IN); Krishna Priya Ganesh, Bangalore (IN); Reshma Ravi, Bangalore (IN)

(73) Assignee: Tata Elxsi Limited, Bangalore (IN)

( * ) Notice: Subject to any disclaimer, the term of this patent is extended or adjusted under 35 U.S.C. 154(b) by 175 days.

(21) Appl. No.: 18/259,542

(22) PCT Filed: Dec. 16, 2021

(86) PCT No.: PCT/IB2021/061825
§ 371 (c)(1),
(2) Date: Jun. 27, 2023

(87) PCT Pub. No.: WO2022/144669
PCT Pub. Date: Jul. 7, 2022

(65) Prior Publication Data
US 2024/0063732 A1    Feb. 22, 2024

(30) Foreign Application Priority Data
Dec. 29, 2020    (IN) ............... 202041057076

(51) Int. Cl.
*H02P 21/00*    (2016.01)
*H02P 6/10*     (2006.01)
(Continued)

(52) U.S. Cl.
CPC ............... *H02P 6/10* (2013.01); *H02P 21/10* (2013.01); *H02P 21/22* (2016.02); *H02P 27/085* (2013.01);
(Continued)

(58) Field of Classification Search
CPC .... H02P 6/10; H02P 6/16; H02P 27/08; H02P 21/22; H02P 21/10; H02P 2203/03; H02P 27/00
See application file for complete search history.

(56) References Cited

U.S. PATENT DOCUMENTS 6,639,371 B2 * 10/2003 Walters ............... H02P 6/20
                                                     290/51
9,870,002 B1    1/2018 Holmberg et al.
(Continued)

OTHER PUBLICATIONS

International Search Report for PCT/IB2021/061825, dated Dec. 16, 2021, 2 pages.
(Continued)

*Primary Examiner* — Karen Masih
(74) *Attorney, Agent, or Firm* — FINNEGAN, HENDERSON, FARABOW, GARRETT & DUNNER, LLP (57) ABSTRACT

A motor controller (100) is provided for smooth operation of an electric motor (102), which mitigates torque ripple, noise and vibration effects, and increases a life span of the motor (102). The motor controller (100) includes a speed controller (120), current transformation units (128 and 130), a current controller (132), and a pulse width modulation (PWM) signal generator (134). The current controller (132) determines a duty cycle of PWM gate signals used for controlling a rotor (104) speed within a particular sector (302A) of the motor (102) based on a reference quadrature-axis current and an actual quadrature-axis current. The PWM signal generator generates the PWM gate signals having the determined duty cycle, controls the rotor (104) speed, and incrementally varies a current speed of the motor (102) to achieve a target speed by modulating operations of a specific pair of inverter switches (502C and 502E) using the PWM gate signals.

10 Claims, 7 Drawing Sheets

(51) Int. Cl.
  *H02P 21/10* (2016.01)
  *H02P 21/22* (2016.01)
  *H02P 27/08* (2006.01)
(52) U.S. Cl.
  CPC ...... *H02P 2203/03* (2013.01); *H02P 2209/07* (2013.01); *H02P 2209/13* (2013.01)

(56) References Cited

U.S. PATENT DOCUMENTS

2003/0034748 A1  2/2003  Walters et al.
2020/0195180 A1  6/2020  Li et al.

OTHER PUBLICATIONS

Written Opinion of the International Searching Authority, PCT/IB2021/061825, dated Dec. 16, 2021, 7 pages.

* cited by examiner

SYSTEM AND METHOD FOR CONTROLLING OPERATION OF A MOTOR

RELATED ART

Embodiments of the present disclosure relate generally to a system and method for controlling operation of a motor. More particularly, the present disclosure relates to a system and associated method for controlling operation of a brushless direct current electric motor.

A brushless direct current (BLDC) motor is an electronically commutated motor powered by a direct current electric source via an external motor controller. The BLDC motor provides several advantages over brushed direct current (DC) and induction motors such as better speed versus torque characteristics, high dynamic response, and long operating life. Hence, the BLDC motor finds use in a variety of applications and systems, for example, in automobiles, computers, automation systems, and health-care devices.

Generally, a BLDC motor includes one or more permanent magnets acting as a rotor, one or more coil windings acting as a stator, and an external motor controller for commutating the BLDC motor. Commutation is a process that is typically performed in the BLDC motor for sequentially switching and varying current among the stator windings, which causes the rotor to continuously rotate around the stator windings and helps control speed of the BLDC motor. Presently existing BLDC motors mostly use three types of commutation approaches, namely a trapezoidal approach, a sinusoidal approach, and a field oriented control (FOC) approach for controlling the speed of the BLDC motor.

The trapezoidal approach is the most widely used approach for controlling the BLDC motor. The trapezoidal approach uses three current controllers for controlling current in the stator windings. However, all three current controllers operate on alternating currents, which cause undesirable variations in torque output of the BLDC motor, especially when the BLDC motor operates at lower speeds. Such undesirable variation in the torque output is generally known as a torque ripple that causes the BLDC motor to vibrate and generate noise, and affects precise and smooth speed control of the BLDC motor, especially at lower speeds.

Unlike the trapezoidal approach, the sinusoidal approach generally does not cause torque ripple when the BLDC motor operates at lower speeds. However, the sinusoidal approach is inefficient in controlling torque output of the BLDC motor at higher speeds, and thus affects smooth operation of the BLDC motor at higher speeds. Further, the sinusoidal approach uses complex algorithms and expensive positioning sensors for controlling the speed of the BLDC motor.

Another conventional approach is the FOC approach. The FOC approach is generally efficient in controlling torque output of the BLDC motor at both lower and higher speeds. In the FOC approach, magnetic fields of the stator windings and the rotor are orthogonal to each other to achieve a maximum electromagnetic torque. Further, the FOC approach uses a decoupled control of flux and torque that allows the BLDC motor to operate above a nominal speed using a field weakening technique, thereby preventing torque ripple. However, the FOC approach uses very complex motor controllers, complicated algorithms, multiple current controllers and transforms, and requires a lot of development and implementation effort, thus proving to be an expensive motor control option. US granted U.S. Ser. No. 10/069,447B2 describes such an example of the FOC approach. In particular, the previously mentioned patent describes an FOC approach that employs a set of current regulators for regulating current provided as inputs to the stator windings. Developing and tuning these set of current regulators, however, requires significant human efforts.

Hence, there is a need for an improved system that is cost-effective, simple to implement, and that efficiently controls torque output of the BLDC motor at both lower and higher speeds, thereby ensuring smooth operations of the motor at any speed.

BRIEF DESCRIPTION

It is an objective of the present disclosure to provide a motor controller for operating an electric motor including a rotor and one or more coil windings. The motor controller includes one or more position sensors that identify a particular sector from a plurality of sectors in the electric motor in which the rotor is positioned. The motor controller further includes a power source that supplies direct current for rotating the rotor. Furthermore, the motor controller includes an inverter operatively coupled to the power source and that converts direct current supplied by the power source into alternating current. The inverter includes a plurality of switches that regulate the alternating current supplied to the coil windings. In addition, the motor controller includes one or more current sensors coupled to the electric motor and that measure the alternating currents supplied to the coil windings when the rotor is positioned in the particular sector. Moreover, the motor controller includes a single speed controller operatively coupled to the position sensors and that determines a reference quadrature-axis current of the rotor when the rotor is positioned in the particular sector using a target speed and a current speed of the electric motor. The current speed is determined based on the rotor position information obtained using the position sensors.

The target speed is received from a speed input system. One or more current transformation units in the motor controller operatively coupled to the current sensors and that determine an actual quadrature-axis current of the rotor based on the measured alternating currents. Further, the motor controller includes a single current controller operatively coupled to the current transformation units and the single speed controller. The current controller determines a duty cycle of a set of pulse width modulation (PWM) gate signals used for controlling the current speed at which the rotor rotates within the particular sector based on the reference quadrature-axis current and the actual quadrature-axis current. In addition, the motor controller includes a PWM signal generator operatively coupled to the single current controller and the inverter. The PWM signal generator generates the PWM gate signals having the determined duty cycle. Further, the PWM signal generator modulates operations of a specific pair of switches in the inverter using the generated PWM gate signals to incrementally vary the current speed of the rotor when moving from the particular sector to another sector in the plurality of sectors to achieve the target speed. A variation in a torque output generated due to movement of the rotor from the particular sector to the another sector of electric motor is within a designated range. Each of the single speed controller and the single current controller includes a single speed proportional-integral-derivative controller.

The motor controller and the electric motor are implemented in a system including one of a vehicle system, a washing machine, a fan, a pump, a robot, an aviation system, an industrial automation system, a healthcare device, and a pick-and-place machine. The electric motor is a brushless direct current motor implemented in one or more of a vehicle system, a washing machine, and a fan, wherein the speed input system includes a memory unit that stores one or more reference values as target speeds of the brushless direct current motor. The electric motor is a brushless direct current motor implemented in a pick-and-place machine. The speed input system includes a processing device that identifies the target speed of the brushless direct current motor based on one or more parameters including a type of an object to be moved from a current position to a target position, a distance between the current and target positions, and a time within which the object is to be moved to the target position.

It is another objective of the present disclosure to provide a method for operating an electric motor including a rotor and one or more coil windings using a motor controller. The method includes receiving a target speed of the electric motor by a single speed controller in the motor controller from a speed input system. Further, the method includes determining a current speed of the electric motor based on the rotor position information obtained using one or more position sensors. Furthermore, the method includes determining a reference quadrature-axis current of the rotor by the single speed controller when the rotor is positioned in a particular sector selected from a plurality of sectors of the electric motor using the target speed and the current speed. In addition, the method includes measuring alternating currents supplied from an inverter to the coil windings using one or more current sensors when the rotor is positioned in the particular sector. Moreover, the method includes determining an actual quadrature-axis current of the rotor by one or more current transformation units in the motor controller based on the measured alternating currents. The method further includes determining a duty cycle of a set of pulse width modulation (PWM) gate signals used for controlling the current speed at which the rotor rotates within the particular sector by a single current controller based on the reference quadrature-axis current and the actual quadrature-axis current.

The method also includes generating the set of PWM gate signals having the determined duty cycle by a PWM signal generator in the motor controller. Additionally, the method includes modulating operations of a specific pair of switches in the inverter using the generated PWM gate signals to incrementally vary the current speed of the rotor when moving from the particular sector to another sector in the plurality of sectors to achieve the target speed. A variation in a torque output generated due to movement of the rotor from the particular sector to the another sector of electric motor is within a designated range. The method includes calculating a speed error by the single speed controller based on a difference between the target and current speeds of the electric motor, determining a speed variable by the single speed controller based on the calculated speed error, and determining the reference quadrature-axis current of the rotor based on the determined speed variable and a proportionality constant. The method includes calculating a current error by the single current controller based on a difference between the reference quadrature-axis current and the actual quadrature-axis current, and determining a current variable by the single current controller based on the calculated current error. The method also includes determining the duty cycle of the set of PWM gate signals by the single current controller based on the determined current variable and the proportionality constant.

The method includes generating a repeating sequence signal including an associated frequency by the PWM signal generator. The frequency corresponds to a switching frequency of the specific set of switches. The frequency determines a number of times the specific set of switches have to be repeatedly turned on and off when the rotor rotates within the particular sector. The method includes generating the PWM gate signal by receiving a first input including the determined duty cycle from the single current controller, a second input including the frequency of the repeating sequence signal from the PWM signal generator, and a third input including a position information corresponding to a current position of the rotor in the electric motor. The method further includes controlling the switching frequency and the ON period of the specific set of switches modulates an amount of current supplied from a power source to one or more of the coil windings via the specific set of switches. Modulation of the amount of current supplied to one or more of the coil windings controls the speed at which the rotor rotates within the particular sector.

BRIEF DESCRIPTION OF DRAWINGS

These and other features, aspects, and advantages of the claimed subject matter will become better understood when the following detailed description is read with reference to the accompanying drawings in which like characters represent like parts throughout the drawings, wherein:

DETAILED DESCRIPTION

The following description presents an exemplary system and associated method for controlling operation of a BLDC motor. Particularly, embodiments described herein disclose a motor controller that utilizes a modified trapezoidal control approach for precisely and smoothly adjusting an operational speed of BLDC motors.

Generally, BLDC motors are used in a variety of applications and systems. For example, BLDC motors are used in vehicle systems for controlling operations of windshield wipers, power windows, power doors, power steering, disk drives, heating, ventilation, and air conditioning (HVAC) systems, and electric drive systems. Additionally, the BLDC motors are used in other systems, for example, in washing machines, fans, pumps, robots, doors, aviation, automation systems, and healthcare devices. These BLDC motors generally include motor controllers that control operational speeds of the BLDC motors for optimal operation of associated units. For example, a BLDC motor implemented in a washing machine includes a motor controller that controls operational speeds of the BLDC motor depending upon operational modes of the washing machine. In one implementation, the motor controller limits speed of the BLDC motor to 500 revolutions per minute (rpm) when the washing machine operates in a gentle wash mode and to 900 rpm when operating in a strong wash mode for optimal washing without damaging the clothes.

As noted previously, existing BLDC motor controllers typically use a trapezoidal approach, a sinusoidal approach, or a field oriented control (FOC) approach for controlling operations of the BLDC motor. Of these approaches, the trapezoidal commutation approach is most widely used in applications where precise control is not critical as this approach is simple and cost-effective. However, the motor controller utilizing the trapezoidal approach generates torque ripple especially when the BLDC motors operate at lower speeds. The resulting torque ripple affects precise and smooth control of BLDC motors, causes the BLDC motors to vibrate and generate noise, and ultimately reduces life span of the BLDC motors. Examples of applications where the trapezoidal commutation approach is used for controlling BLDC motors include driving systems of electric shopping carts and hobby drones where precise and smooth control are not of great significance.

Alternatively, a motor controller may utilize a sinusoidal approach. However, even the sinusoidal approach is mostly used in applications that do not require precise control as this approach is also known to generate torque ripple, especially when the BLDC motors operate at higher speeds. In contrast, a BLDC motor controller utilizing the FOC approach is mostly used in applications that require precise motor control as this approach is efficient in controlling torque output of the BLDC motors at both lower and higher speeds. An example of an application where the FOC approach is used for controlling a BLDC motor includes robotic packaging where it is important to precisely control placement of items, packing of items, and picking of items at defined time intervals. Another example of an application utilizing the FOC approach for controlling BLDC motors includes healthcare devices such as infusion pumps, peristaltic pumps, dialysis machines, metering devices, ventilators, imaging devices, and surgical robots. While the FOC approach efficiently controls torque outputs, it necessitates use of multiple current controllers, current transformation units, and complicated algorithms, and incurs significant development and running costs.

Embodiments of the present disclosure describe a motor controller that uses a modified trapezoidal control (MTC), which can be utilized in the previously mentioned applications irrespective of whether or not they require precise motor control. When compared to the existing trapezoidal commutation and sinusoidal approaches, the MTC approach efficiently mitigates torque ripple when the BLDC motor operates at both lower and higher speeds. In particular, the MTC approach allows the present motor controller to smoothly and precisely increase or decrease a speed of the BLDC motor to a desired speed by gradually increasing or decreasing current supplied to coil windings with every sector-wise movement of a rotor component. Use of the MTC approach, thus, leads to smooth and precise control of BLDC motors, reduction in motor noise and vibrations, and increased life span of the BLDC motors. Further, when compared to the FOC approach, the present motor controller is simple, cost effective, easy to implement, and can operate using only one current controller in contrast to two current controllers used in the FOC approach. An exemplary motor controller that uses the MTC approach for efficiently operating a BLDC motor is described in greater detail with reference to FIG. 1.

Figure 1:
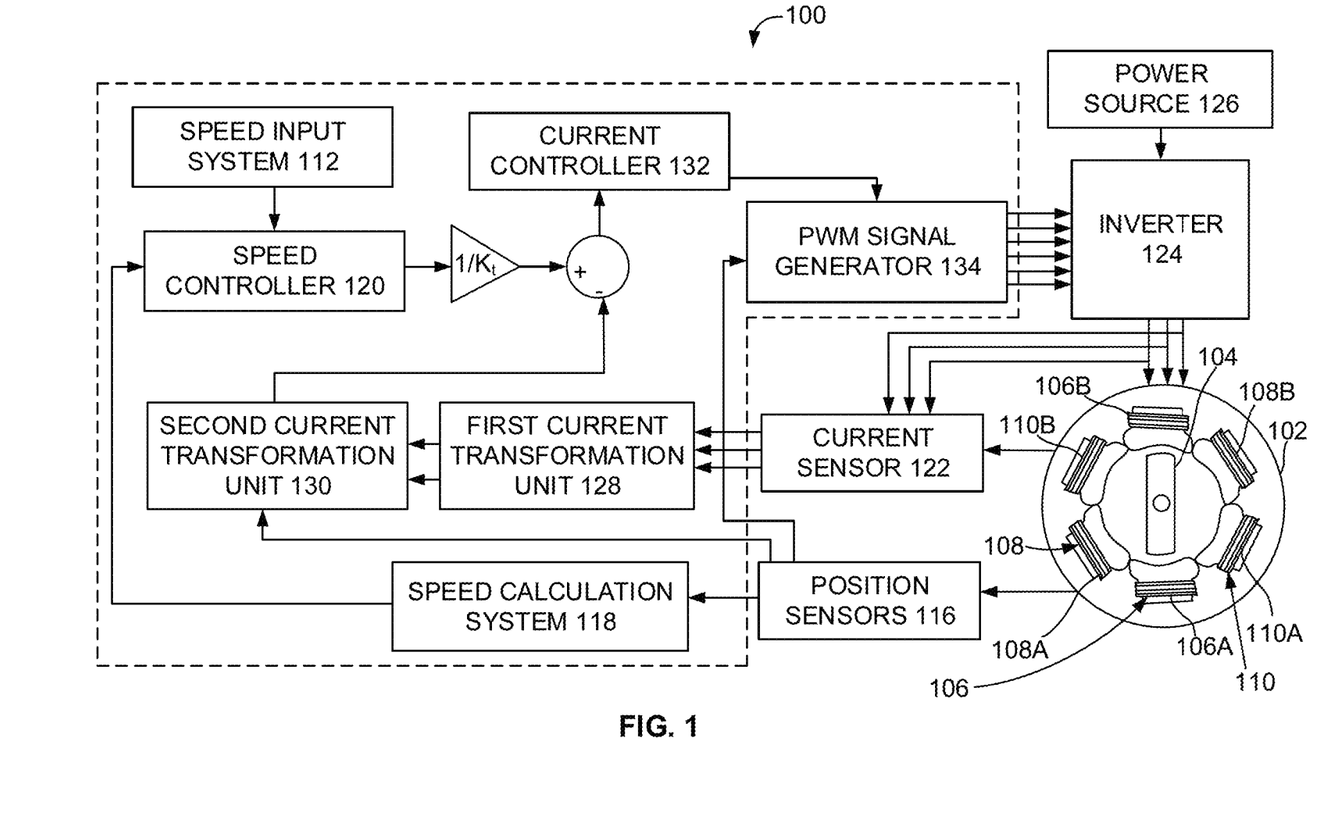
FIG. 1 illustrates a block diagram depicting an exemplary motor controller that is operatively coupled to a BLDC motor for controlling an operating speed of the BLDC motor, in accordance with aspects of the present disclosure.

FIG. 1 illustrates a block diagram of an exemplary motor controller (100) that is operatively coupled to a BLDC motor (102) for controlling an operational speed of the BLDC motor (102). In one embodiment, the motor controller (100) may be implemented by suitable code on a processor-based system, such as a general-purpose or a special-purpose computer. Accordingly, the motor controller (100), for example, includes one or more microcontrollers, general purpose processors, specialized processors, graphical processing units, microprocessors, programming logic arrays, field programming gate arrays, and/or other suitable computing devices. For simplicity, the motor controller (100) described in the following embodiments includes, and is implemented using a single microcontroller.

Additionally, an embodiment of the motor controller (100) is described herein with reference to controlling speed of a three-phase BLDC motor for clarity. However, it is to be understood that the present motor controller (100) can also be used to control a speed of one or more of a single-phase BLDC motor, a two-phase BLDC motor, and other multi-phase BLDC motors.

In certain embodiments, the three-phase BLDC motor (102) includes one or more permanent magnets acting as rotors, and a plurality of coil windings acting as the stator. For example, FIG. 1 depicts an embodiment of the BLDC motor (102) including a single rotor (104). However, in alternative embodiments, the BLDC motor (102) may have more than one rotor (104).

Additionally, in one embodiment, the BLDC motor (102) includes three coil windings, namely first coil windings (106), second coil windings (108), and third coil windings (110). Each of the coil windings (106, 108, and 110) in the BLDC motor (102) includes two or more teeth for energizing and rotating the rotor (104). For instance, as shown in FIG. 1, the first coil windings (106) include a first set of teeth (106A-B), the second coil windings include a second set of teeth (108A-B), and the third coil windings (110) include a third set of teeth (110A-B). In one embodiment, alternating currents supplied to these teeth (106A-B, 108A-B, and 110A-B) are incrementally controlled by the motor controller (100) for smoothly and precisely varying a speed of the BLDC motor (102) to a desired target speed without causing significant variations in torque outputs produced by the BLDC motor (102).

As previously noted, the motor controller (100) uses the MTC approach for controlling or varying a current speed of the BLDC motor (102) to achieve a target speed. In one embodiment, the target speed corresponds to one or more particular speeds at which the BLDC motor (102) is to be operated for optimal operation of associated units. Further, the target speed of the BLDC motor (102) may vary for different application areas of the BLDC motor (102).

In a power window application, for example, the target speed of the BLDC motor (102) is constant and varies from one vehicle model to another. For instance, the target speed of the BLDC motor (102) used in a first vehicle model may be preset to 75 rpm. In this example, the motor controller (100) gradually increases a current speed of the BLDC motor from zero rpm to 75 rpm upon pressing a window activation button for opening the vehicle window within a preset time of five seconds. In another instance, the target speed of the BLDC motor (102) used in a second vehicle model is preset to 100 rpm. In this example, the motor controller (100) increases a current speed of the BLDC motor from zero rpm to 100 rpm upon pressing a window activation button for opening the vehicle window within a preset time of four seconds.

In another application area related to a washing machine, the target speed of the BLDC motor (102) is not constant and varies with various operational modes of the washing machine. For example, the washing machine may include three operational modes namely gentle wash, quick wash, and strong wash modes whose associated preset motor speeds are 400 rpm, 600 rpm, and 800 rpm, respectively. A user turns on the washing machine and selects the gentle wash mode. In this example, the current speed and the target speed of the BLDC motor (102) corresponds to zero rpm and 400 rpm, respectively. Further, in this example, the motor controller (100) gradually increases the current motor speed from zero rpm to the target speed of 400 rpm upon turning on the washing machine and selecting the gentle wash mode.

Furthermore, in the previously noted example, the user may suddenly change the operational mode from the gentle wash mode to the quick wash mode. In such a scenario, the motor controller (100) increases the current motor speed of 400 rpm to the target speed of 600 rpm. In yet another example, the user resets the operational mode from the quick wash mode to the gentle wash mode. In this example, the motor controller (100) decreases the current motor speed of 600 rpm to the target speed of 400 rpm. Thus, it may be noted that the target speed of the BLDC motor (102) can be either greater or lesser than the current speed of the BLDC motor (102). Similarly, in another application area related to a domestic robot, the target speed of the BLDC motor (102) achieved using the motor controller (100) varies with operational modes of the domestic robot, such as during an items pick mode, an items place mode, and a floor cleaning mode.

In certain embodiments, the motor controller (100) receives the target speed as an input from a speed input system (112) that varies with application areas of the BLDC motor (102). With reference to one of the previously noted application areas related to the washing machine, the speed input system (112) corresponds to a memory device that stores different speed values for different operational modes of the washing machine. When a user selects a particular mode, the motor controller (100) selects a particular speed value corresponding to the selected mode from the speed input system (112) as the target speed. In another application related to a ceiling fan, the speed input system (112) corresponds to a fan regulator or a remote controller. For example, the user may turn the fan regulator currently pointing to a conventional numeral marking '5' to a conventional numeral making '2'. Turning the fan regulator to the conventional marking '2' provides inputs to the motor controller (100) for operating the BLDC motor (102) at a defined target speed.

In certain application areas, the speed input system (112) calculates the target speed of the motor (102) in real-time in lieu of pre-storing a set of values as target speeds. For example, in an application area related to a pick-and-place machine, the speed input system (112) may include a processor-enabled device. In this example, the speed input system (112) automatically calculates the target speed of the motor (102) based on a type of an object to be moved from a current position to a target position, a distance between the current and target positions, and a time by which the object is to be moved to the target position. Thus, it may be noted that the input system (112) providing the target speed as an input to the controller (100) is not restricted to a particular type of device, and varies depending on application areas of the motor (102).

In certain embodiments, upon receiving the target speed as an input from the speed input system (112), the motor controller (100) determines a current speed of the BLDC motor (102) for adjusting the current speed of the BLDC motor (102) to the target speed. To that end, the motor controller (100) is operatively coupled to one or more position sensors (116). Examples of such position sensors (116) include hall-effect sensors, rotary encoders, and electrical resolvers. Specifically, in one embodiment, the BLDC motor (102) includes three position sensors (116), for example, three hall-effect sensors (116) positioned within the BLDC motor (102) at intervals of 60 degrees or 120 degrees. These position sensors (116) continuously monitor and identify a position of the rotor (104) in the BLDC motor (102). Further, the position sensors (116) transmit sensor signals corresponding to the identified rotor position to a speed calculation system (118) in the motor controller (100). The speed calculation system (118) calculates the current speed of the motor (102) based on the identified rotor position, as described subsequently with reference to FIGS. 2A and 2B.

In one embodiment, the speed calculation system (118) provides the current speed of the BLDC motor (102), calculated using the rotor position information, as an input to a speed controller (120) in the motor controller (100). An example of the speed controller (120) includes a proportional-integral-derivative (PID) controller. Subsequently, the speed PID controller (120) determines a reference quadrature-axis (q-axis) current associated with the rotor (104)

using the current speed and the target speed of the BLDC motor (102) as described in detail with reference to FIGS. 2A-2B.

In certain embodiments, upon determining the reference q-axis current, the motor controller (100) determines an actual q-axis current associated with the rotor (104) using a current sensor (122) coupled to the motor controller (100) for adjusting the current speed of the BLDC motor (102) to the target speed. The current sensor (122) measures an alternating current supplied from an inverter (124) to each of the coil windings (106, 108, and 110). In one embodiment, the inverter (124) is a three-phase inverter that converts a direct current supply received from a power source (126), such a battery pack, into alternating current and supplies a corresponding alternating current to each of the coil windings (106, 108, and 110).

In certain embodiments, the current sensor (122) provides the measured values of the alternating currents supplied from the inverter (124) as inputs to a first current transformation unit (128), and subsequently to a second current transformation unit (130). An example of the first current transformation unit (128) includes a Clarke transformation unit. An example of the second current transformation unit (130) includes a Park transformation unit. The Clarke and Park transformation units (128 and 130) convert the measured values of the alternating currents into two time invariant current values such as a direct-axis (d-axis) current value and the actual q-axis current value associated with the rotor (104). Further, the Park transformation unit (130) provides the actual q-axis current value associated with the rotor (104) as an input to a current controller (132) in the motor controller (100). An example of the current controller (132) includes a PID controller.

In certain embodiments, the current PID controller (132) is operatively coupled to a pulse width modulation (PWM) signal generator (134). The PWM signal generator (134) generates PWM gate signals for modulating ON and OFF states of switches (502A-F) (shown in FIG. 5) in an inverter (124), and thereby controlling alternating currents provided as inputs to the coil windings (106, 108, and 110) to control an operational speed of the BLDC motor (102), as described with reference to FIGS. 5 and 6. In one embodiment, each of the generated PWM gate signals includes a particular duty cycle determined by the current PID controller (132) using values of the reference q-axis current and the actual q-axis current. Specifically, the current PID controller (132) iteratively determines the duty cycles of the PWM gate signals when the rotor (104) is positioned at each of a plurality of sectors of the BLDC motor (102), as described in detail in the following sections with reference to FIGS. 3, 5 and 6.

In certain embodiments, the current PID controller (132), the PWM signal generator (134), the speed calculation system (118), the Clarke and Park transformation units (128 and 130), and the speed PID controller (120) in the motor controller (100) may be implemented as a processor-based system, such as a general-purpose or a special-purpose computer running suitable code. Accordingly, the current and speed PID controllers (132 and 120), the PWM signal generator (134), the speed calculation system (118), and the Clarke and Park transformation units (128 and 130), for example, include one or more microcontrollers, general purpose processors, specialized processors, graphical processing units, microprocessors, programming logic arrays, field programming gate arrays, and/or other suitable computing devices.

Unlike existing motor controllers such as FOC-based motor controllers that employ multiple current controllers, an inverse park transformation unit, a space vector pulse width modulation (SVPWM) generator, and complicated speed adjustment protocols, the present motor controller (100) includes a single current controller (132) and simple speed adjustment steps. In particular, the present motor controller (100) uses the MTC approach to optimally control operation of the BLDC motor (102) using a single current controller (132). An embodiment of the MTC approach used by the motor controller (100) to precisely and smoothly vary a speed of the BLDC motor (102) while preventing torque ripple and resulting performance degradation at different speeds is described in detail with reference to FIGS. 2A-2B.

Figure 2A:
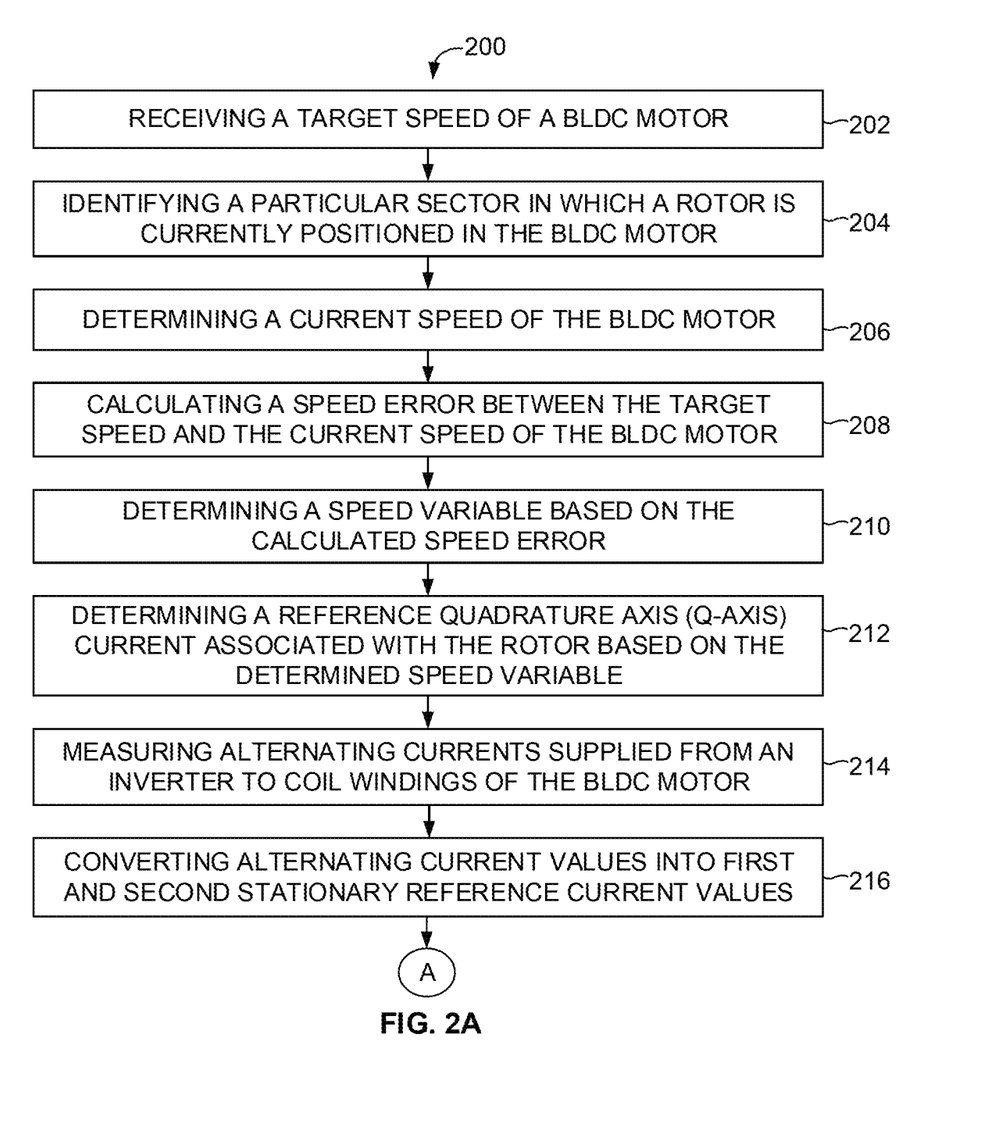
FIGS. 2A-B illustrate a flow diagram depicting an exemplary method for operating the BLDC motor using the motor controller of FIG. 1, in accordance with aspects of the present disclosure.
Figure 2B:
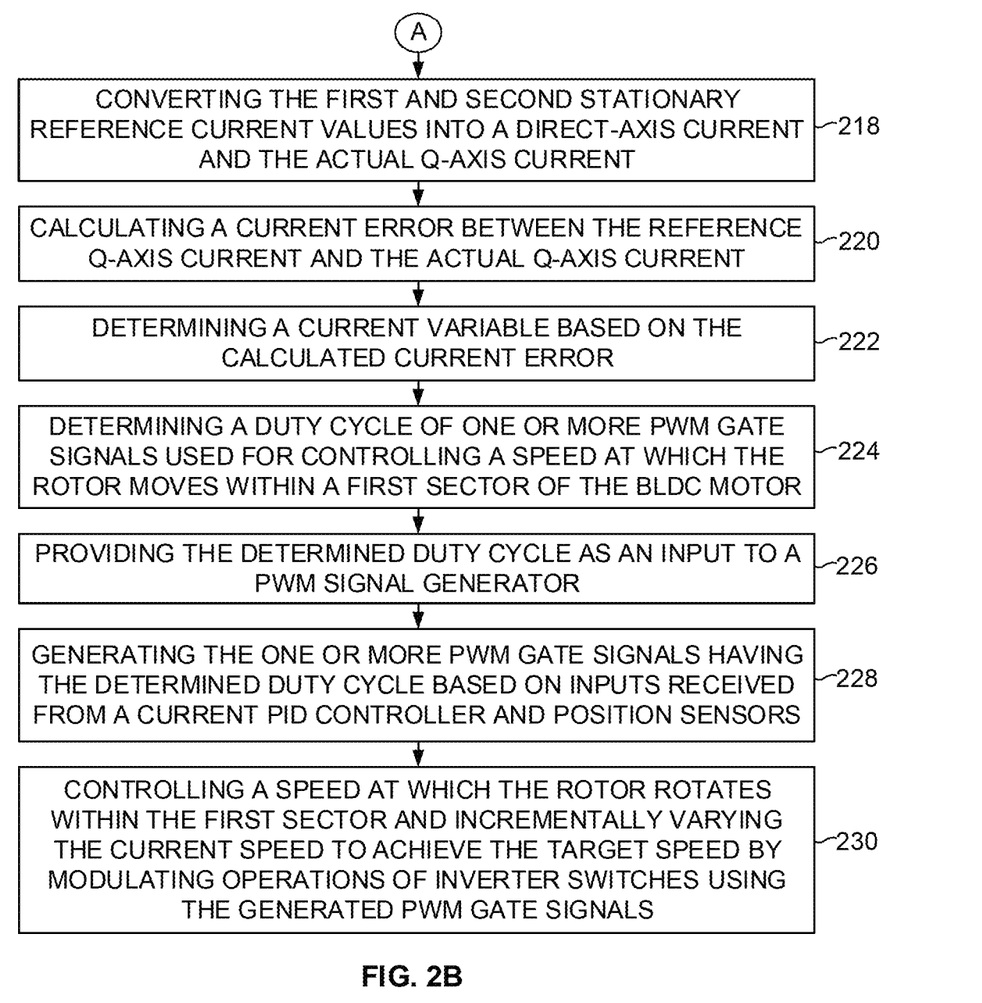

FIGS. 2A and 2B illustrate a flow diagram depicting an exemplary method (200) for achieving optimal operation of a BLDC motor (102) in an associated system by minimizing torque ripple and by smoothly and precisely varying a speed of the BLDC motor (102) from a current speed to a target speed using the motor controller (100) of FIG. 1. As noted previously, examples of the system utilizing the BLDC motor (102) include power windows, washing machines, fans, and robots. The order in which the exemplary method (200) is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein.

For simplicity, the method (200) for achieving optimal operation of the BLDC motor (102) is described in the following sections with reference to its use in a washing machine. For example, the BLDC motor (102) is used in a washing machine currently washing synthetic fabrics in a quick wash mode, where a current speed of the associated BLDC motor (102) corresponds to 600 rpm. When a washing process is ongoing, a user adds delicate fabrics such as silk and wool fabrics to the machine and changes an operational mode from the quick wash mode to a gentle wash mode for optimal wash without damaging the recently added fabrics. A preset motor speed value for the gentle wash mode corresponds to 400 rpm. In this example, the motor controller (100) decreases the current motor speed of 600 rpm to the target motor speed of 400 rpm, as described in detail with reference to steps (202)-(230). However, it is to be understood that the motor controller (100) is also capable of increasing speed of the BLDC motor (102) when the target motor speed is greater than the current motor speed.

In particular, at step (202), the speed PID controller (120) receives the target speed of the BLDC motor (102) for varying the current speed of the BLDC motor (102) to the received target speed. In one embodiment, the speed PID controller (120) receives the target speed as an input from the speed input system (112), which either calculates the target speed in real-time or pre-stores the target speed, as described previously with reference to FIG. 1.

At step (204), the one or more position sensors (116) identify a particular sector in which the rotor (104) is currently positioned in the BLDC motor (102). In one embodiment, the BLDC motor (102) is divided into six-different sectors, namely, a first sector (302A), a second sector (302B), a third sector (302C), a fourth sector (302D), a fifth sector (302E), and a sixth sector (302F). The rotor (104) continuously rotates across these sectors (302A-F) either in an anti-clockwise direction or in a clockwise direction during an operation of the BLDC motor (102).

Figure 3:
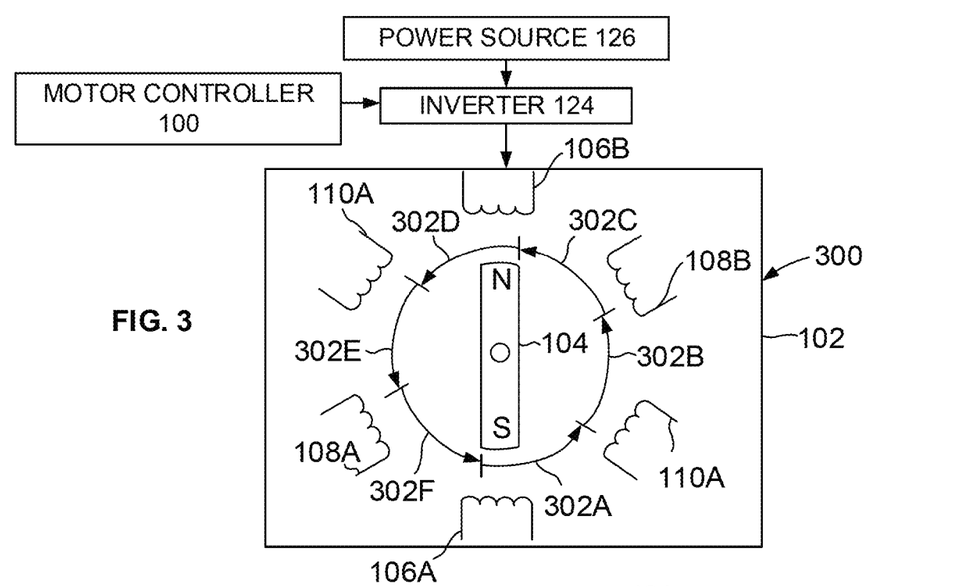
FIG. 3 illustrates an exemplary circuit diagram of the BLDC motor of FIG. 1 having the rotor positioned in a first sector of the BLDC motor, in accordance with aspects of the present disclosure.

For example, the rotor (104) rotates in an anti-clockwise direction first by 60 degrees to move from the first sector (302A) to the second sector (302B) during an operation of the BLDC motor (102). Similarly, the rotor (104) continuously rotates in 60 degrees increments to sequentially move to the second sector (302B), the third sector (302C), the fourth sector (302D), the fifth sector (302E), the sixth sector (302F), and finally back to the first sector (302A). The position sensors (116), thus, help in identifying the particular sector in the BLDC motor (102) in which the rotor (104) is currently positioned. For example, FIG. 3 illustrates an exemplary circuit diagram (300) of the BLDC motor (102) depicting the rotor (104) positioned in the first sector (302a) of the BLDC motor (102) during its rotation. It may be noted that an overall speed of the BLDC motor (102) is controlled by controlling a speed at which the rotor (104) rotates within each of the six sectors (302A-F).

At step (206), the speed calculation system (118) determines a current speed of the BLDC motor (102). In one embodiment, the speed calculation system (118) dynamically receives position information of the rotor (104) derived from the position sensors (116) and determines the current speed of the BLDC motor (102) using the position information. At step (208), the speed PID controller (120) calculates a speed error between the target speed and the current speed of the BLDC motor (102). Specifically, the speed PID controller (120) calculates the speed error by determining a difference between target and current speeds, for example, using equation (1).

$$SE=(TS-CS) \quad (1)$$

where, 'SE' corresponds to the speed error, and 'TS' and 'CS' correspond to the target speed and the current speed of the BLDC motor (102), respectively.

Further, at step (210), the speed PID controller (120) determines a speed variable based on the calculated speed error. In one embodiment, the speed PID controller (120) determines the speed variable using equation (2).

$$VSCS(t) = Kpe(t) + Ki \int_0^t e(T)dT + Kd\frac{de(t)}{dt} \quad (2)$$

where, 'VSCS' is the speed variable, 'Kp' corresponds to a proportional gain, 'Ki' corresponds to an integral gain, and 'Kd' corresponds to a derivative gain. Further, 'e(t)' corresponds to the determined speed error, 't' corresponds to an instantaneous time, and 'T' corresponds to a variable of integration.

Subsequently, at step (212), the speed PID controller (120) determines a reference quadrature-axis (q-axis) current associated with the rotor (104) based on the determined speed variable, for example, using equation (3).

$$IQ\text{ref}=VSCS(t)*1/Kt \quad (3)$$

where, 'IQref' corresponds to the reference q-axis current, 'VSCS' is the speed variable, and 'Kt' corresponds to proportionality constant.

In one embodiment, the motor controller (100) determines an actual q-axis current associated with the rotor (104) in addition to the reference q-axis current for adjusting the current speed of the BLDC motor (102) to the target speed. To that end, at step (214), the current sensor (122) measures alternating currents supplied from the inverter (124) to the coil windings (106, 108, and 110) of the BLDC motor (102). Specifically, the current sensor (122) measures a first alternating current, a second alternating current, and a third alternating current supplied from the inverter (124) to the first, the second, and the third coil windings (106, 108, and 110), respectively.

The current sensor (122) then provides the measured alternating current values as inputs to the Clarke transformation unit (128). At step (216), the Clarke transformation unit (128) converts these alternating current values into first and second stationary reference current values. Further, the Clarke transformation unit (128) provides the first and second stationary reference current values as inputs to the Park transformation unit (130).

At step (218), the Park transformation unit (130) converts these first and second stationary reference current values into two time invariant current values such as a direct-axis (d-axis) current and the actual q-axis current associated with the rotor (104). Subsequently, the Park transformation unit (130) provides the actual q-axis current of the rotor (104) as an input to the current PID controller (132).

In certain embodiments, the current PID controller (132) used in the present motor controller (100) is different from current PID controllers used in conventional trapezoidal and FOC approaches. For example, in a conventional trapezoidal approach, a motor controller includes three current PID controllers. Each of these current PID controllers generates a corresponding output used for adjusting a current speed of a BLDC motor to a target speed. Thus, in the conventional trapezoidal approach, an existing motor controller controls speed of the motor based on outputs of three different current PID controllers. In contrast, the motor controller (100) utilizes the MTC approach to configure the output current from a single current PID controller (132) suitably to reduce torque ripple and to smoothly control the motor speed.

Further, in the conventional trapezoidal approach, all three current PID controllers receive input current values from a current sensor for the speed control of the BLDC motor. These input current values are alternating in nature and vary even when a rotor in a BLDC motor rotates at a constant speed. Generally, the current PID controllers receiving such current values that are alternating in nature would cause the BLDC motor to generate a significant amount of torque ripple. The generated torque ripple thus affects precise and smooth speed control of the BLDC motor especially at lower speeds and causes the BLDC motor to vibrate and generate noise, thereby causing wear and tear of motor components and reducing an overall life span of the BLDC motor. In contrast, the current PID controller (132) used in the motor controller (100) receives a value of the actual q-axis current from the Clarke-Park transformation units (128 and 130). It may be noted that the received value of the q-axis current is constant in nature and does not vary when the rotor (104) in the BLDC motor (102) rotates at a constant speed. The current PID controller (132) receiving such a constant current value from the Clarke-Park transformation units (128 and 130) would not cause much variations in the torque output of the BLDC motor (102). Hence, the motor controller (100) enables the BLDC motor (102) to produce substantially constant torque output, which mitigates torque ripple, minimizes vibration effects, allows for smooth control of the BLDC motor (102). Mitigating the torque ripple reduces wear and tear of motor components and increases an overall life span of the BLDC motor.

Similarly, the present motor controller (100) is also advantageous over a motor controller utilizing the FOC approach. The motor controller using the FOC approach includes multiple current PID controllers, current transformation units, and a space vector pulse width modulation (SVPWM) generator, which all use complicated algorithms and perform complex operations for precise controlling of motor speed and torque ripple. For example, the current PID controllers process both the d-axis current and the actual q-axis current received from the Clarke-Park transformation units (128 and 130), and output voltage signals to an inverse park transformation unit. The inverse park transformation unit converts these voltage signals to another pair of voltage signals that are given as inputs to the SVPWM generator, which controls a current speed of the BLDC motor to a target speed using PWM signals having specific duty cycles determined using complicated algorithms and processing steps. Thus, though the motor controller using the FOC approach ensures smooth and precise operation of the BLDC motor, the FOC-based motor controller requires complicated implementation and execution. As noted previously, such a motor controller includes two expensive current PID controllers implementing complex algorithms, three current transformation units, and a SVPWM generator, whose development and tuning activities require a lot of human efforts, and hence, not a cost-effective solution.

In contrast, the motor controller (100) utilizing the present MTC approach can be operated using a single current PID controller (132). The current PID controller (132) determines duty cycles of PWM signals used for controlling motor operations by performing simple operations, for example, using subsequent equations (4) to (6) without needing to use complicated algorithms and multiple current controllers, inverse park transformation units, and SVPWM generators. Hence, the present motor controller (100) is comparatively simple, less complex, requires tuning of only one current PID controller (132) for current control, is easy to implement, and is a cost-effective solution but still effectively mitigates torque ripple at different motor speeds by incrementally varying currents supplied to the coil windings (106, 108, and 110), as described in further detail in the following sections.

At step (220), subsequent to receiving the actual q-axis current from the Park transformation unit (130), the current PID controller (132) calculates a current error between the reference q-axis current and the actual q-axis. In one embodiment, the current PID controller (132) calculates the current error by calculating a difference between the reference and actual q-axis currents, for example, using equation (4).

$$CE=(IQ\text{ref}-IQ\text{act}) \quad (4)$$

where, 'CE' corresponds to the current error, 'IQref' corresponds to the reference q-axis current, and 'IQact' corresponds to the actual q-axis current.

At step (222), the current PID controller (132) determines a current variable based on the calculated current error. For example, the current PID controller (132) determines the current variable using equation (5).

$$VCCS(t) = Kp e(t) + Ki \int_0^t e(T)dT + Kd \frac{de(t)}{dt} \quad (5)$$

where, 'VSCS' is the current variable, 'Kp' corresponds to a proportional gain, 'Ki' corresponds to an integral gain, and 'Kd' corresponds to a derivative gain. Further, 'e(t)' corresponds to the determined current error, 't' corresponds to an instantaneous time, and 'T' corresponds to a variable of integration.

At step (224), the current PID controller (132) determines a duty cycle of one or more pulse width modulation (PWM) gate signals used for controlling a speed at which the rotor (104) moves within the first sector (302A). In one embodiment, the current PID controller (132) determines the duty cycle of the PWM gate signals based on the determined variable, for example, using equation (6).

$$d=VCCS(t)*1/Kt \quad (6)$$

where, 'd' corresponds to the duty cycle of the PWM gate signals, 'VSCS' is the current variable, and 'Kt' corresponds to proportionality constant.

At step (226), the current PID controller (132) provides the determined duty cycle as an input to the PWM signal generator (134). At step (228), the PWM signal generator (134) generates the one or more PWM gate signals having the determined duty cycle based on inputs received from the current PID controller (132) and the position sensors (116). An exemplary approach by which the PWM signal generator (134) generates the PWM gate signal is described in detail with reference to FIG. 4.

Figure 4:
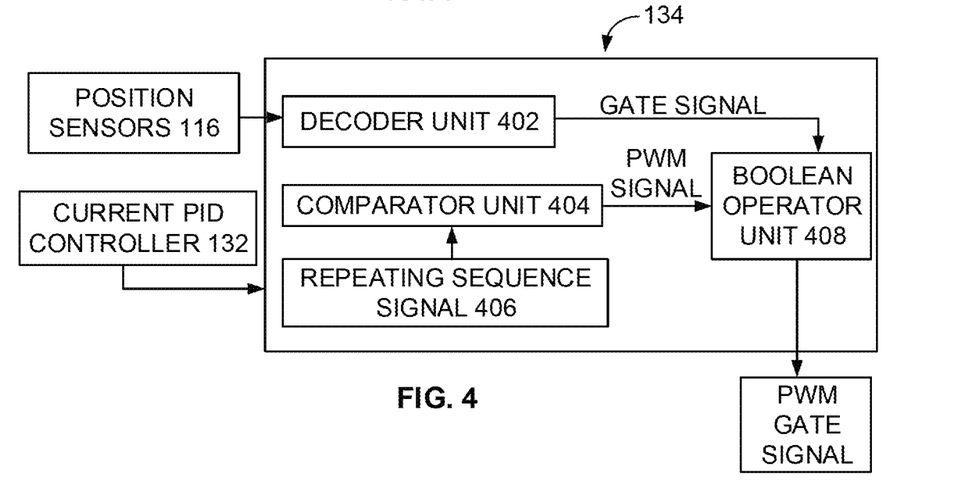
FIG. 4 illustrates a block diagram depicting an exemplary PWM signal generator associated with the motor controller of FIG. 1, in accordance with aspects of the present disclosure.

FIG. 4 illustrates a block diagram depicting an exemplary PWM signal generator (134) that generates the PWM gate signal used for controlling a speed at which the rotor (104) moves within the first sector (302A). To that end, in one embodiment, the PWM signal generator (134) includes a decoder unit (402). The decoder unit (402) receives current position information of the rotor (104) from the one or more position sensors (116), and generates a gate signal that indicates a sector in which the rotor (104) is currently positioned. For example, the decoder unit (402) generates a gate signal that indicates that the rotor (104) is currently positioned in the first sector (302A) of the BLDC motor (102) based on rotor position information received from the one or more position sensors (116).

In certain embodiments, the PWM signal generator (134) further includes a comparator unit (404). The comparator unit (404) generates a PWM signal used for generating the PWM gate signal based on two different inputs. Specifically, the comparator unit (404) receives a first input from the current PID controller (132), where the first input defines a duty cycle of the PWM signal determined using the previously mentioned equation (6). In addition, the comparator unit (404) receives a second input from the PWM signal generator (134), where the second input defines a switching frequency of the PWM signal.

In one embodiment, the switching frequency of the PWM signal is a predetermined value and is same as a frequency of a repeating sequence signal (406). The repeating sequence signal (406) is a periodic scalar high frequency signal having a particular waveform generated by the PWM signal generator (134). The switching frequency of the PWM signal determines a number of times one or more switches in the inverter (124) have to be repeatedly turned ON and OFF when the rotor (104) moves within a particular sector. The switching frequency of the PWM signal is a constant value, and hence, does not vary with the sectors (302A-F). However, the duty cycle of the PWM signal continuously varies with the sectors (302A-F), as described subsequently with reference to FIGS. 5 and 6.

As noted previously, the comparator unit (404) generates the PWM signal by comparing the first input defining the duty cycle with the second input defining the switching frequency of the PWM signal. Further, the comparator unit (404) provides the generated PWM signal as an input to a Boolean operator unit (408) in the PWM signal generator (134). In one embodiment, the Boolean operator unit (408)

is an 'AND' logic operator unit. The Boolean operator unit (408) generates the PWM gate signal by combining the gate signal received from the decoder unit (202) and the PWM signal received from the comparator unit (204).

Referring back to FIGS. 2A-2B, at step (230), the PWM signal generator (134) controls a speed at which the rotor (104) rotates within the first sector (302A) and incrementally varies the current speed to achieve the target speed by modulating operations of inverter switches (see 502C and 502E in FIG. 5) using the generated PWM gate signals, as described with reference to FIGS. 5-6.

Figures 5, 6:
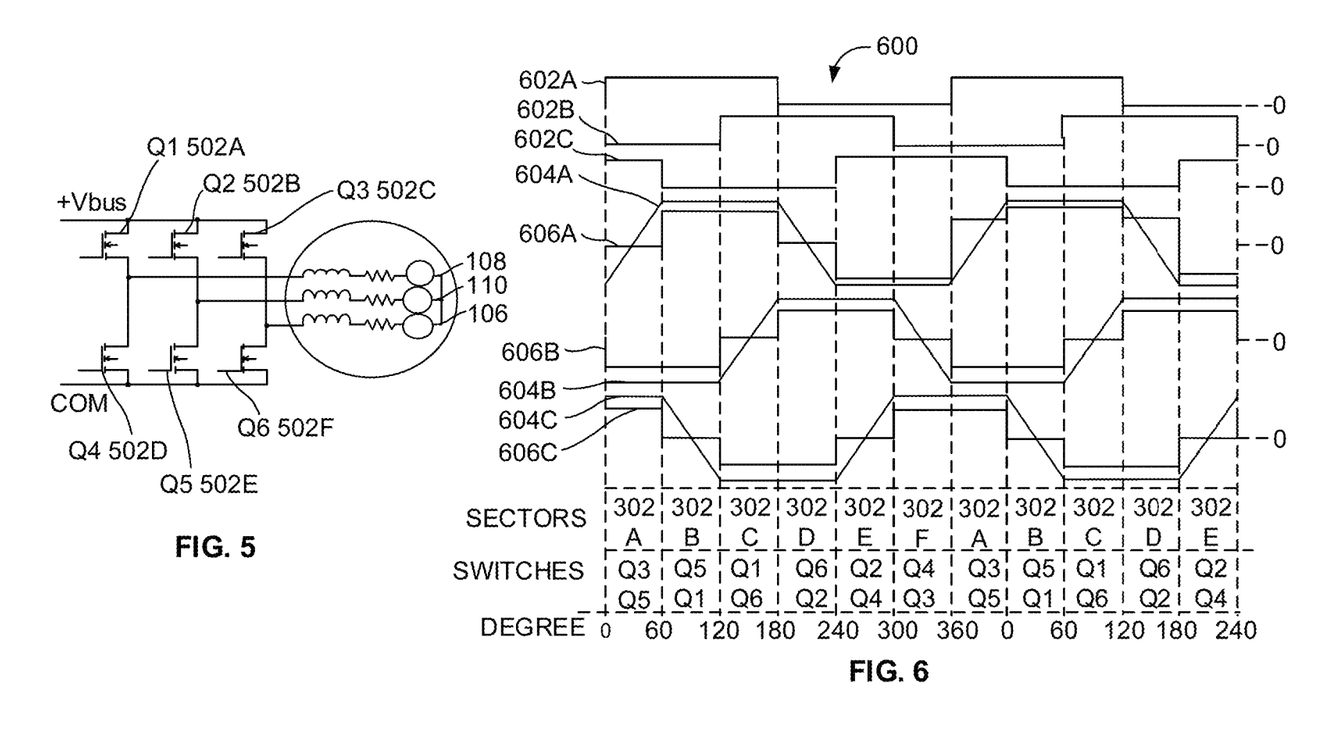
FIG. 5 illustrates a circuit diagram of an exemplary inverter used for adjusting an operational speed of the BLDC motor of FIG. 1, in accordance with aspects of the present disclosure.
FIG. 6 illustrates an exemplary graphical representation depicting output signals of position sensors, back electromotive force waveforms, and alternating current signals associated with adjusting an operational speed of the BLDC motor of FIG. 1, in accordance with aspects of the present disclosure.

FIG. 5 illustrates an exemplary circuit diagram depicting the inverter (124) of FIG. 1. In one embodiment, the inverter (124) includes three upper transistor switches, namely a first switch (502A), a second switch (502B), and a third switch (502C). Further, the inverter (124) includes three lower transistor switches, namely a fourth switch (502D), a fifth switch (502E), and a sixth switch (502F). The switches (502A-F) that are responsible for controlling a speed of the rotor (104) vary with the rotor (104) position in the BLDC motor (102). For example, the switches, responsible for controlling a speed of the rotor (104) when the rotor (104) is positioned in the first sector (302A), may include the third and fifth switches (502C and 502E), as shown in FIG. 6. FIG. 6 depicts an exemplary set of switches responsible for controlling the rotor speed when the rotor (104) is positioned in each of the other sectors (302B-F).

Further, FIG. 6 illustrates an exemplary graphical representation (600) depicting output signals (602A-C) of the position sensors (116), back electromotive force waveforms (604A-C) associated with the coil windings (106, 108, and 110), and alternating current signals (606A-C) supplied from the inverter (124) to the coil windings (106, 108, and 110) when the rotor (104) rotates across the sectors (302A-F).

In certain embodiments, the PWM signal generator (134) receives position information of the rotor (104) as currently positioned in the first sector (302A) from the position sensors (116). Subsequently, the PWM signal generator (134) selects a set of switches responsible for controlling rotation of the rotor (104) in the first sector (302A) from switch configurations stored in a memory unit (not shown in FIGS) of the motor controller (100). For example, the PWM signal generator (134) selects the third switch (502C) and the fifth switch (502E) as the set of switches responsible for controlling rotation of the rotor (104) in the first sector (302A) from the stored switch configurations. The PWM signal generator (134) then controls operations of the identified switches (502C and 502E) by modulating a switching frequency and a duty cycle of the PWM gate signals for varying the current speed to the target speed.

In an exemplary scenario, a current speed of the BLDC motor (102) used in a washing machine is 600 rpm, the target speed is 400 rpm, and the rotor (104) is currently positioned in the first sector (302A). In this example, the current PID controller (132) determines a duty cycle of PWM gate signals controlling the switches (502C and 502E) based on a reference q-axis and an actual q-axis current, for example, using the previously mentioned equations (4)-(6). For instance, the determined duty cycle of the PWM gate signals may be 90%. Subsequently, the PWM signal generator (134) generates the PWM gate signals having 90% duty cycle and having an exemplary switching frequency that corresponds to 100.

Accordingly, in one embodiment, the PWM signal generator (134) repeatedly turns the switches (502C and 502E) ON and OFF 100 times based on the associated switching frequency of 100 when the rotor (104) rotates within the first sector (302A) and before moving to the second sector (302B). Turning the switches (502C and 502E) repeatedly ON and OFF multiple times to regulate the current flow reduces torque ripple produced by the BLDC motor (102).

In addition, when the rotor (104) rotates within the first sector (302A), the PWM signal generator (134) maintains the switches (502C and 502E) in an ON state only 90% of time based on the associated duty cycle. As a result, exemplary currents such as a first current of 1 Ampere and a second current of 2 Ampere supplied from the power source (126) to the first coil windings (106) and the second coil windings (108), respectively via the switches (502C and 502E) are effectively reduced to 0.9 Ampere and 1.8 Ampere. It may be noted that the supply of reduced amounts of currents to the coil windings (106 and 108) may reduce a speed at which the rotor (104) moves within the first sector (302A), which in turn, reduces the current speed of the BLDC motor (102), for example, from 600 rpm to 540 rpm.

Thus, in the previously noted example, the rotor (104) moves within the first sector (302) and positions itself in the second sector (302B) at a reduced speed of 540 rpm. Subsequent to positioning of the rotor (104) in the second sector (302B), the motor controller (100) re-performs the steps from (204) to (230) to determine a duty cycle of a new set of PWM gate signals used for controlling a speed at which the rotor (104) moves within the second sector (302B).

For example, the motor controller (100) re-determines the reference q-axis current based on the current motor speed of 540 rpm using equations (1)-(3). The motor controller (100) also re-determines the actual q-axis current when the rotor (104) is positioned in the second sector (302B). Further, the motor controller (100) determines a duty cycle of new PWM gate signals controlling the switches (502E and 502A) and controlling the speed of the rotor (104) within the second sector (302B) based on the re-determined reference and actual q-axis currents. For example, the motor controller (100) determines that the duty cycle of new PWI gate signals is 85%.

In the previously noted example, when the rotor (104) rotates within the second sector (302B), the PWM signal generator (134) maintains the switches (502E and 502A) in an ON state only 85% of time based on the associated duty cycle. As a result, exemplary currents such as a first current of 1 Ampere and a second current of 2 Ampere supplied from the power source (126) to the second coil windings (108) and the third coil windings (110), respectively via the switches (502E and 502A) are effectively reduced to 0.85 Ampere and 1.7 Ampere. It may be noted that the supply of reduced amount of currents to the coil windings (108 and 110) may reduce a speed at which the rotor (104) moves within the second sector (302B), which in turn, further reduces the speed of the BLDC motor (102), for example, to 459 rpm Similarly, it is to be understood that the motor controller (100) iteratively generates a new set of PWM gate signals having a specific duty cycle every time the rotor (104) moves to a subsequent sector. The motor controller (100) then uses such newly generated PWM gate signals for gradually reducing current supplied to one or more of the coil windings (106, 108, and 110), and thereby gradually adjusting an initial motor speed of 600 rpm to the target speed of 400 rpm. It may be noted that the motor controller (100) gradually decreases current supplied to the coil windings (106, 108, and 110) in lieu of abruptly decreasing the current supply. Hence, the motor controller (100) correspondingly and smoothly decreases the initial motor speed of 600 rpm to the target motor speed 400 rpm while minimizing torque ripple produced during speed reduction. In particular, the motor controller (100) iteratively determines duty cycles of PWM gate signals to gradually reduce the current supply until the BLDC motor (102) attains the target speed of 400 rpm. Post attaining the target speed, the motor controller (100) generates PWM gate signals having the same duty cycle for all the sectors (302A-F) such that the rotor (104) rotates at the same speed across all the sectors (302A-F). The gradual speed reduction minimizes torque ripple, mitigates motor noise and vibrations, reduces wear and tear of motor components, and increases an overall life span of the BLDC motor (102). Unlike traditional trapezoidal and sinusoidal approaches, the motor controller (100) utilizing the MTC approach efficiently minimizes torque ripple irrespective of whether the BLDC motor (102) operates at lower or higher speeds. For example, FIGS. 7A-C illustrate exemplary graphical representations depicting torque waveforms output by the BLDC motor when operating at a lower speed of 250 rpm.

Figure 7A:
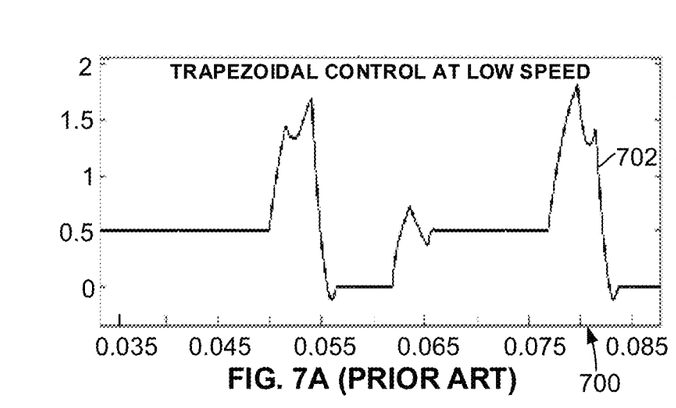
FIGS. 7A and 7B illustrate exemplary graphical representations depicting torque waveforms output by the BLDC motor when operating at a lower speed and when using a conventional trapezoidal control approach and a field oriented control approach, respectively.
Figure 7B:
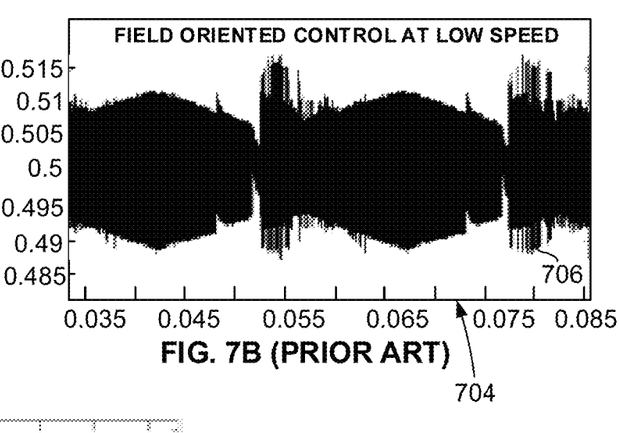
Figure 7C:
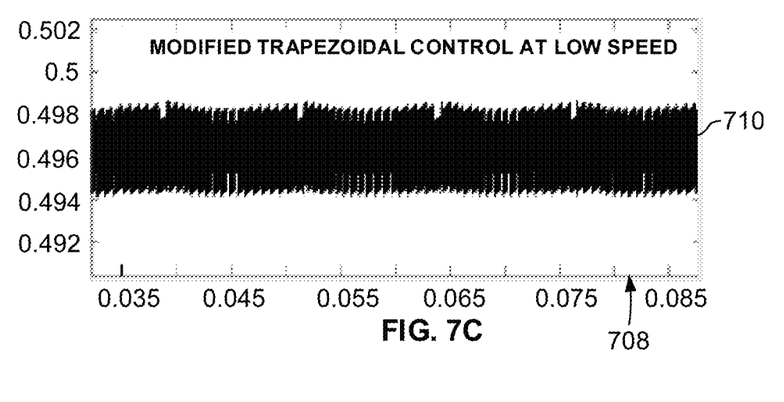
FIG. 7C illustrates an exemplary graphical representation depicting torque waveforms output by the BLDC motor when operating at a lower speed and when using a modified trapezoidal control approach, in accordance with aspects of the present disclosure.

Specifically, FIG. 7A illustrates an exemplary graphical representation (700) depicting time versus a torque waveform (702) output by the BLDC motor (102) when operating at a lower speed and when using a conventional trapezoidal approach. Similarly, FIGS. 7B-C illustrate exemplary graphical representations (704 and 708) depicting time versus torque waveforms (706 and 710) output by the BLDC motor (102) when operating at a lower speed and when using a FOC approach and the present MTC approach, respectively. From FIGS. 7A-C, it may be noted that that the torque waveform (702) depicted in FIG. 7A includes many variations, which indicates that the BLDC motor (102) utilizing the conventional trapezoidal approach generates torque ripple at lower speeds. Further, it may be noted that variations in the torque waveforms (706 and 710) are minimal and are almost similar, which indicate that both the FOC approach and the present MTC approach are equally efficient in minimizing torque ripple at lower motor speeds.

Figures 8A, 8C:
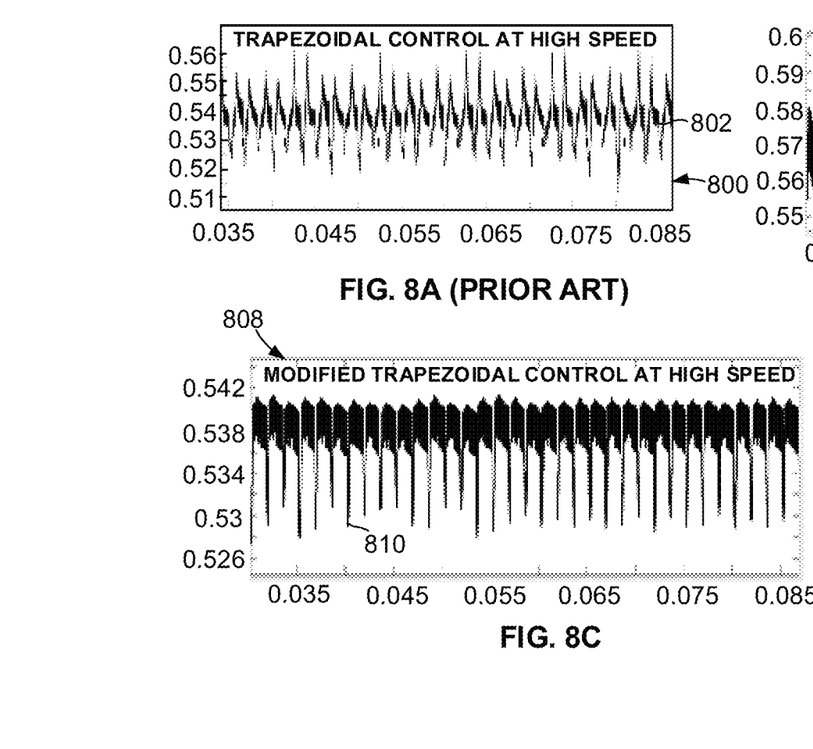
FIGS. 8A and 8B illustrate exemplary graphical representations depicting torque waveforms output by the BLDC motor when operating at a higher speed and when using the conventional trapezoidal control approach and the field oriented control approach, respectively.
FIG. 8C illustrates an exemplary graphical representation depicting torque waveforms output by the BLDC motor when operating at a higher speed and when using the modified trapezoidal control approach, in accordance with aspects of the present disclosure.
Figure 8B:
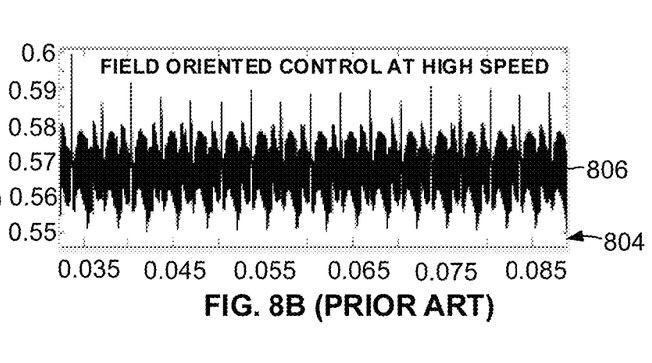

Similarly, FIGS. 8A-C illustrate exemplary graphical representations depicting torque waveforms output by the BLDC motor (102) when operating at a higher speed, for example, at 1500 rpm. Specifically, FIGS. 8A-C illustrate exemplary graphical representation (800, 804, and 808) depicting time versus torque waveforms (802, 806, and 810) output by the BLDC motor (102) when operating at a higher speed and when using a conventional trapezoidal approach, a FOC approach, and the present MTC approach, respectively.

From FIG. 8A, it may be noted that that the torque waveform (802) includes minimal but constant variations including multiple crest portions (812) and trough portions (814), which indicate that the BLDC motor (102) utilizing the conventional trapezoidal approach generates minimum torque ripple at higher speeds. Further, when compared to the torque waveform (802), it may be noted that the torque waveform (806) includes comparatively a lesser number of crest portions (816), which indicate that torque outputs of the BLDC motor (102) have not varied significantly from time to time while using the FOC approach. Hence, when compared to the conventional trapezoidal approach, the BLDC motor (102) utilizing the FOC approach generates even lesser torque ripple at higher speeds. Further, in one implementation, the torque waveform (810) output by the modified trapezoidal approach has comparatively least torque variations ranging, for example, between 0.540 Newton meter (Nm) and 0.542 Nm as shown in FIG. 8C, which indicates that the modified trapezoidal approach is a most efficient approach in minimizing torque ripple at higher motor speeds.

Figure 9:
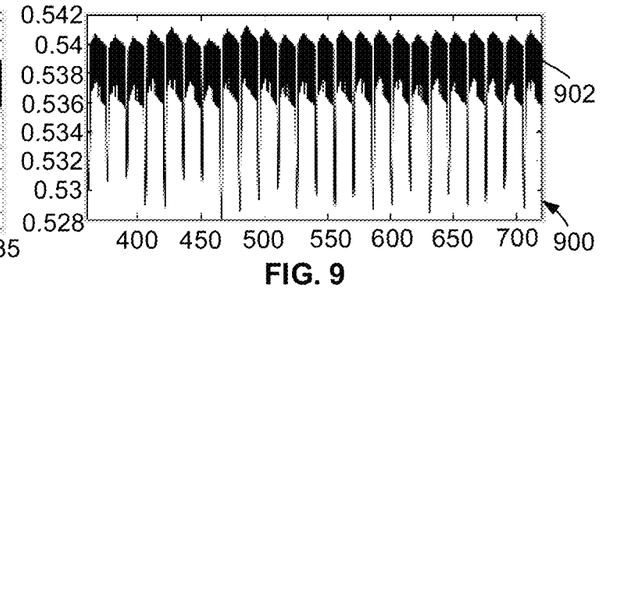
FIG. 9 illustrates an exemplary graphical representation including an X-axis representing the position of the rotor within the BLDC motor and a Y-axis representing a torque waveform output by the BLDC motor when operating at a designated speed and when using the modified trapezoidal approach, in accordance with aspects of the present disclosure.

Further, FIG. 9 illustrates an exemplary graphical representation (900) including an X-axis representing the position of the rotor (104) within the BLDC motor (102) and a Y-axis representing a torque waveform (902) output by the BLDC motor (102) when operating at a designated speed and when using the present MTC approach. It may be noted that from FIG. 9 that when the rotor (104) moves by a certain degree from one sector to another sector within the BLDC motor (102), a variation in a torque output generated due to such a sector-wise movement of the rotor (104) is very minimally and ranges between 0.540 Newton meter and 0.542 Newton meter. Such a minimal variation in the torque output ensures that the BLDC motor (102) does not generate a significant amount of torque ripple, which leads to smooth and precise control of the BLDC motor (102), reduction in motor noise and vibrations, and an increased life span of the BLDC motor (102). Further, the following Table 1 depicts signal statistics associated with torque outputs of the BLDC motor (102) when using the conventional trapezoidal approach (CTA), the conventional FOC approach (CFOCA), and an embodiment of the present MTC approach (MTCA).

TABLE 1

| Speed (RPM) | Signal Statistics | CTA | CFOCA | MTCA |
| --- | --- | --- | --- | --- |
| 250 | Maximum | 1.987 | 3.737 | 1.299 |
|  | Minimum | −0.1147 | −1.503 | 0 |
|  | Peak-to-Peak | 2.101 | 5.241 | 1.299 |
|  | Mean | 0.4565 | 0.5085 | 0.4985 |
|  | Median | 0.4883 | 0.4976 | 0.498 |
|  | RMS | 0.6543 | 0.7617 | 0.494 |
| 1500 | Maximum | 1.243 | 2.955 | 1.867 |
|  | Minimum | −0.07243 | −0.3845 | −0.01 |
|  | Peak-to-Peak | 1.315 | 3.339 | 1.877 |
|  | Mean | 0.5411 | 0.5412 | 0.5412 |
|  | Median | 0.5382 | 0.5376 | 0.5385 |
|  | RMS | 0.5530 | 0.55 | 0.5461 |

In Table 1, the terms 'maximum' and 'minimum' indicate a maximum torque and a minimum torque produced by the BLDC motor (102), respectively. A 'peak-to-peak' value represents a difference between the maximum torque and the minimum torque. Further, the peak-to-peak value represents variations in torque outputs of the BLDC motor (102), where the value is a function of torque ripple produced by the BLDC motor (102). Exemplary peak-to-peak values produced by the BLDC motor (102) when operating at a lower speed of 250 rpm and when using the conventional trapezoidal approach (CTA), the conventional field oriented control approach (CFOCA), and the modified trapezoidal control approach (MTCA) are 2.101, 5.241, and 1.299, respectively. From these peak-to-peak values, it may be noted that the present modified trapezoidal control approach is 61.83% more efficient than the conventional trapezoidal approach and 24.79% more efficient than the conventional field oriented control approach in minimizing torque ripple produced by the BLDC motor (102) at lower speeds.

In addition, Table 1 also provides exemplary peak-to-peak values produced by the BLDC motor (102) when operating at a higher speed of 1500 rpm and when using the conventional trapezoidal approach, the conventional field oriented control approach, and the modified trapezoidal control approach as 1.315, 3.339, and 1.877, respectively. From these peak-to-peak values, it may be noted that the present modified trapezoidal control approach is 70% more efficient than the conventional trapezoidal approach and 56.21% more efficient than the conventional field oriented control approach in minimizing torque ripple at higher motor speeds.

Thus, when compared to conventional trapezoidal and FOC approaches, the motor controller (100) utilizing the present MTC approach is significantly more efficient in minimizing torque ripple produced by the BLDC motor (102) at all speed ranges. Hence, the motor controller (100) substantially minimizes noise and vibrations that occur during operation of the BLDC motor (102) at both lower and higher speeds. Further, the motor controller (100) varies an operational speed of the BLDC motor (102) more precisely and smoothly to generate negligible torque ripple during operation of the BLDC motor (102) at different speeds.

In addition, the motor controller (100) includes only a single current PID controller (132) in contrast to three current PID controllers used in the conventional trapezoidal approach and two current PID controllers used in the FOC approach. The motor controller (100), thus, requires tuning of only one current PID controller (132) for current control, whereas the FOC approach requires tuning of at least two different current PID controllers. Further, the motor controller (100) does not need multiple components such as an inverse park transformation unit and a SVPWM generator typically used in the FOC approach for adjusting an operating speed of the BLDC motor (102). Further, the motor controller (100) determines a duty cycle of PWM gate signals in a simplistic manner without using complicated algorithms used in the FOC approach. Thus, the motor controller (100) includes lesser components, requires tuning of only one current PID controller (132), is easy to implement, and thus, proves to be a more cost-effective solution than the FOC approach.

Although specific features of various embodiments of the present systems and methods may be shown in and/or described with respect to some drawings and not in others, this is for convenience only. It is to be understood that the described features, structures, and/or characteristics may be combined and/or used interchangeably in any suitable manner in the various embodiments shown in the different figures.

While only certain features of the present systems and methods have been illustrated and described herein, many modifications and changes will occur to those skilled in the art. It is, therefore, to be understood that the appended claims are intended to cover all such modifications and changes as fall within the true spirit of the claimed invention.

LIST OF NUMERAL REFERENCES

| | |
|---|---|
| 100 Motor Controller | 200, 202-230 Method and associated steps for Operating an Electric Motor |
| 102 Electric Motor | 300 Motor Circuit Diagram |
| 104 Motor Rotor | 302A-F Motor Sectors |
| 106A-B, 108A-B, and 110A-B Coil Windings | 402 Decoder Unit |
| 112 Speed Input System | 404 Comparator Unit |
| 116 Position Sensors | 406 Repeating Sequence Signal |
| 118 Speed Calculation System | 408 Boolean Operator Unit |
| 120 Speed Controller | 502A-F Inverter Switches |
| 122 Current Sensor | 600 Graphical Representation |
| 124 Inverter | 602A-C Position Sensor Signals |
| 126 Power Source | 604A-C Back EMF Waveforms |
| 128, 130 Transformation Units | 606A-C Alternating Current Signals |
| 132 Current Controller | 700, 704, 708, 800, 804, 808, 900 Graphical Representations |
| 134 PWM Signal Generator | 702, 706, 710, 802, 806, 810, 902 Torque Waveforms |
| 812, 816 Crest Portions | 814 Trough Portions |

The invention claimed is:

1. A motor controller (100) for operating an electric motor (102) comprising a rotor (104), and one or more coil windings (106, 108, and 110), the motor controller (100) comprising:
   one or more position sensors (116) that identify a particular sector (302A) from a plurality of sectors (302A-F) in the electric motor (102) in which the rotor (104) is positioned;
   a power source (126) that supplies direct current for rotating the rotor (104);
   an inverter (124) operatively coupled to the power source (126) and that converts direct current supplied by the power source (126) into alternating current, wherein the inverter (124) comprises a plurality of switches (502A-F) that regulate the alternating current supplied to the coil windings (106, 108, and 110);
   one or more current sensors (122) coupled to the electric motor (102) and that measure the alternating currents supplied to the coil windings (106, 108, and 112) when the rotor (104) is positioned in the particular sector (302A);
   a single speed controller (120) operatively coupled to the position sensors (116) and that determines a reference quadrature-axis current of the rotor (104) when the rotor (104) is positioned in the particular sector (302A) using a target speed and a current speed of the electric motor (102), wherein the current speed is determined based on the rotor (104) position information obtained using the position sensors (116), wherein the target speed is received from a speed input system (112);
   one or more current transformation units (128 and 130) operatively coupled to the current sensors (122) and that determine an actual quadrature-axis current of the rotor (104) based on the measured alternating currents;
   a single current controller (132) operatively coupled to the current transformation units (128 and 130) and the single speed controller (120), wherein the current controller (132) determines a duty cycle of a set of pulse width modulation (PWM) gate signals used for controlling the current speed at which the rotor (104) rotates within the particular sector (302A) based on the reference quadrature-axis current and the actual quadrature-axis current; and
   a PWM signal generator (134) operatively coupled to the single current controller (132) and the inverter (124), wherein the PWM signal generator (134):
      generates the PWM gate signals having the determined duty cycle, and
      modulates operations of a specific pair of switches (502C and 502E) in the inverter (124) using the generated PWM gate signals to incrementally vary the current speed of the rotor (104) when moving from the particular sector to another sector in the plurality of sectors (302A-F) to achieve the target speed, such that a variation in a torque output generated due to movement of the rotor (104) from the particular sector to the another sector of electric motor (102) is within a designated range.

2. The motor controller (100) as claimed in claim 1, wherein the single speed controller (120) comprises a single speed proportional-integral-derivative controller, and wherein the single current controller (132) comprises a single current proportional-integral-derivative controller.

3. The motor controller (100) as claimed in claim 1, wherein the motor controller (100) and the electric motor (102) are implemented in a system comprising one of a vehicle system, a washing machine, a fan, a pump, a robot, an aviation system, an industrial automation system, a healthcare device, and a pick-and-place machine.

4. The motor controller (100) as claimed in claim 1, wherein the electric motor (102) is a brushless direct current motor (102) implemented in one or more of a vehicle system, a washing machine, and a fan, wherein the speed input system (112) comprises a memory unit that stores one or more reference values as target speeds of the brushless direct current motor (102).

5. The motor controller (100) as claimed in claim 1, wherein the electric motor (102) is a brushless direct current motor (102) implemented in a pick-and-place machine, wherein the speed input system (112) comprises a processing device that identifies the target speed of the brushless direct current motor (102) based on one or more parameters comprising a type of an object to be moved from a current position to a target position, a distance between the current and target positions, and a time within which the object is to be moved to the target position.

6. A method for operating an electric motor (102) comprising a rotor (104), and one or more coil windings (106, 108, and 110) using a motor controller (100), the method comprising:
receiving a target speed of the electric motor (102) by a single speed controller (120) in the motor controller (100) from a speed input system (112);
determining a current speed of the electric motor (102) based on the rotor (104) position information obtained using one or more position sensors (116);
determining a reference quadrature-axis current of the rotor (104) by the single speed controller (120) when the rotor (104) is positioned in a particular sector (302A) selected from a plurality of sectors (302A-F) of the electric motor (102) using the target speed and the current speed;
measuring alternating currents supplied from an inverter (124) to the coil windings (106, 108, and 112) using one or more current sensors (122) when the rotor (104) is positioned in the particular sector (302A);
determining an actual quadrature-axis current of the rotor (104) by one or more current transformation units (128 and 130) in the motor controller (100) based on the measured alternating currents;
determining a duty cycle of a set of pulse width modulation (PWM) gate signals used for controlling the current speed at which the rotor (104) rotates within the particular sector (302A) by a single current controller (132) based on the reference quadrature-axis current and the actual quadrature-axis current;
generating the set of PWM gate signals having the determined duty cycle by a PWM signal generator (134) in the motor controller (100); and
modulating operations of a specific pair of switches (502C and 502E) in the inverter (124) using the generated PWM gate signals to incrementally vary the current speed of the rotor (104) when moving from the particular sector to another sector in the plurality of sectors (302A-F) to achieve the target speed, such that a variation in a torque output generated due to movement of the rotor (104) from the particular sector to the another sector of electric motor (102) is within a designated range.

7. The method as claimed in claim 6, wherein the method comprises:
calculating a speed error by the single speed controller (120) based on a difference between the target speed and the current speed of the electric motor (102);
determining a speed variable by the single speed controller (120) based on the calculated speed error; and
determining the reference quadrature-axis current of the rotor (104) based on the determined speed variable and a proportionality constant.

8. The method as claimed in claim 7, wherein the method comprises:
calculating a current error by the single current controller (132) based on a difference between the reference quadrature-axis current and the actual quadrature-axis current;
determining a current variable by the single current controller (132) based on the calculated current error; and
determining the duty cycle of the set of PWM gate signals by the single current controller (132) based on the determined current variable and the proportionality constant.

9. The method as claimed in claim 8, wherein the method comprises generating a repeating sequence signal (406) comprising an associated frequency by the PWM signal generator (134),
wherein the frequency corresponds to a switching frequency of the specific set of switches (502C and 502E), and wherein the frequency determines a number of times the specific set of switches (502C and 502E) have to be repeatedly turned on and off when the rotor (104) rotates within the particular sector (302A).

10. The method as claimed in claim 9, wherein the method comprises:
generating the PWM gate signal by receiving a first input comprising the determined duty cycle from the single current controller (132), a second input comprising the frequency of the repeating sequence signal (406) from the PWM signal generator (134), and a third input comprising a position information corresponding to a current position of the rotor (104) in the electric motor (102) from the one or more position sensors (116); and
controlling the switching frequency and an ON period of the specific set of switches (502C and 502E) based on the frequency of the repeating sequence signal (406) and the duty cycle of the generated PWM gate signal, respectively, and
wherein controlling the switching frequency and the ON period of the specific set of switches (502C and 502E) modulates an amount of current supplied from a power source (126) to one or more of the coil windings (106, 108, and 110) via the specific set of switches (502C and 502E), and wherein modulation of the amount of current supplied to one or more of the coil windings (106, 108, and 110) controls the speed at which the rotor (104) rotates within the particular sector (302A).

\* \* \* \* \*